April 12, 1932. A. McDOWALL 1,854,052
TRACTOR
Filed Nov. 20, 1928 4 Sheets-Sheet 1
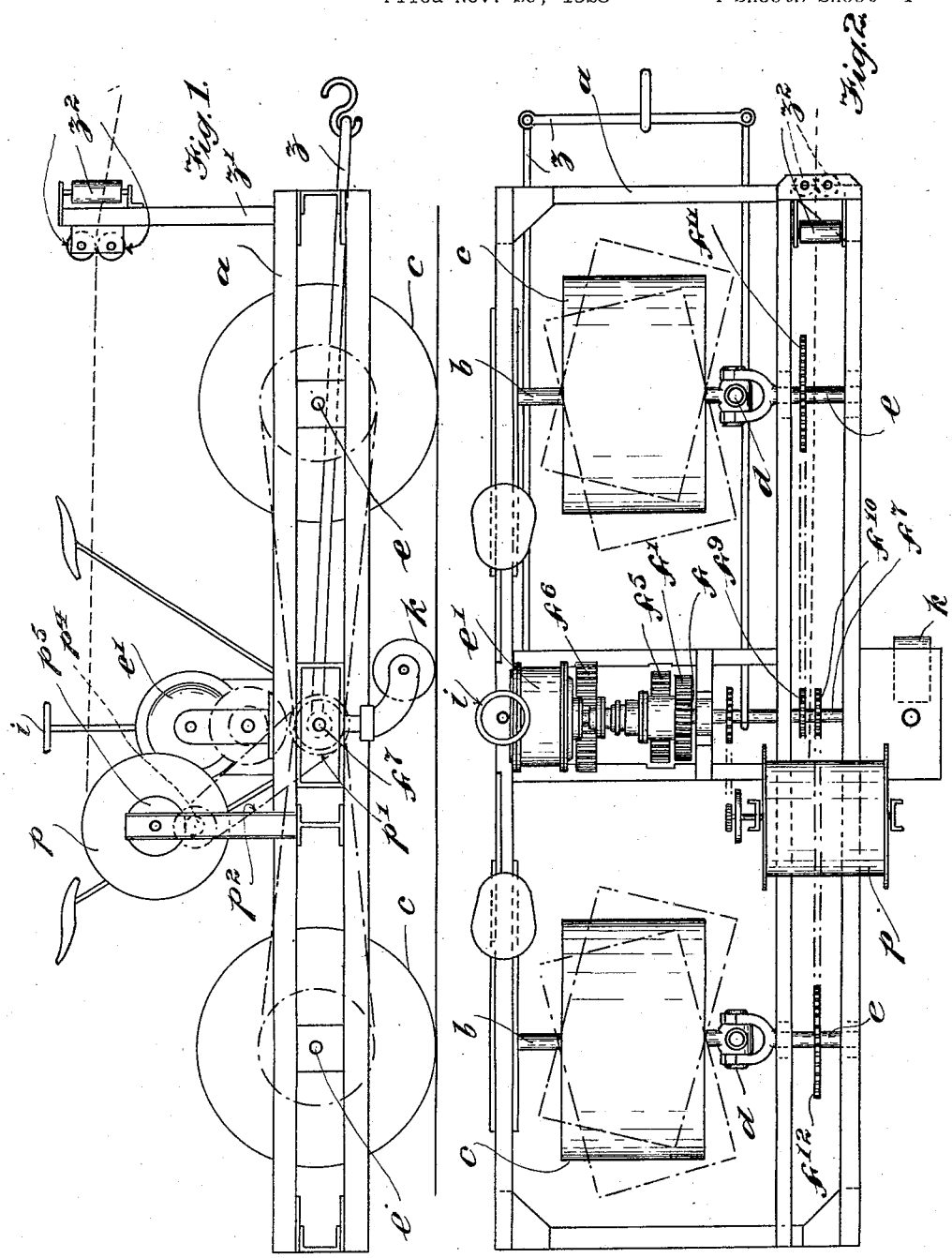
Inventor:-
Andrew McDowall,
by his Attorneys
Howson & Howson April 12, 1932.  A. McDOWALL  1,854,052
TRACTOR
Filed Nov. 20, 1928    4 Sheets-Sheet 2
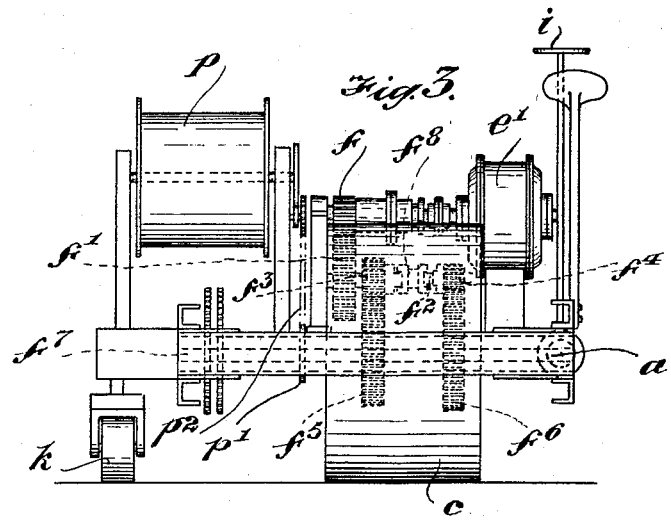
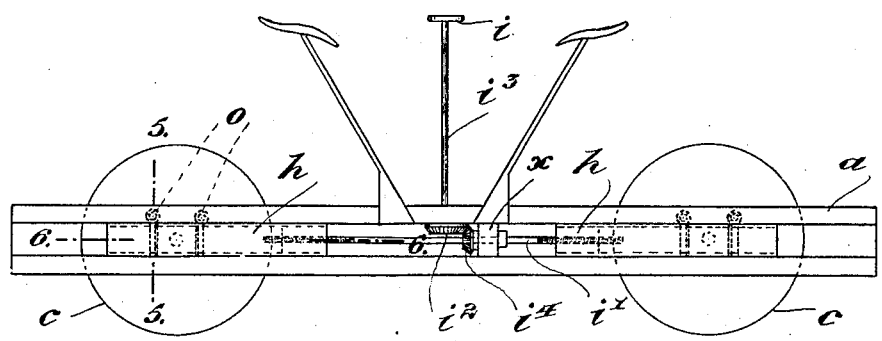
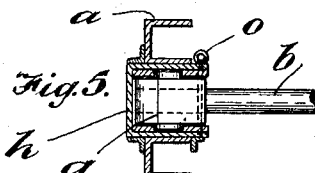
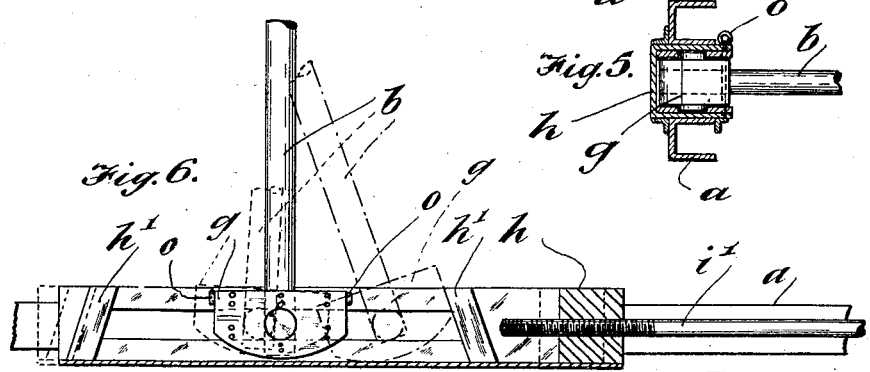

April 12, 1932.  A. McDOWALL  1,854,052
TRACTOR
Filed Nov. 20, 1928  4 Sheets-Sheet 3

Inventor:
Andrew McDowall,
by his Attorneys
Howson & Howson

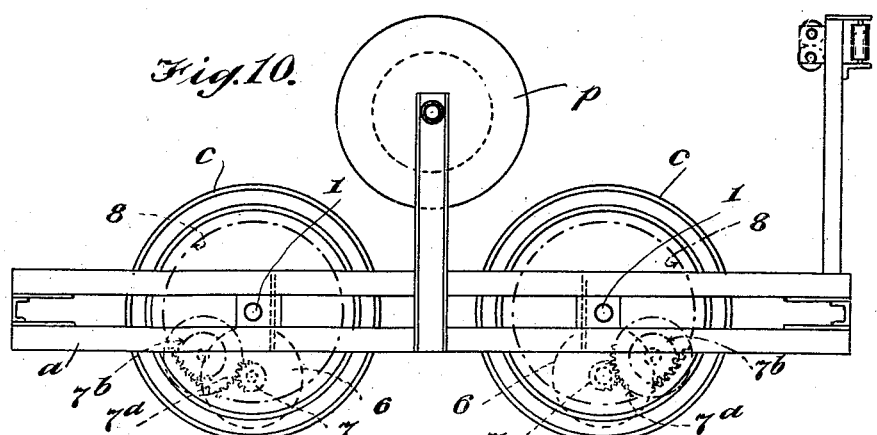
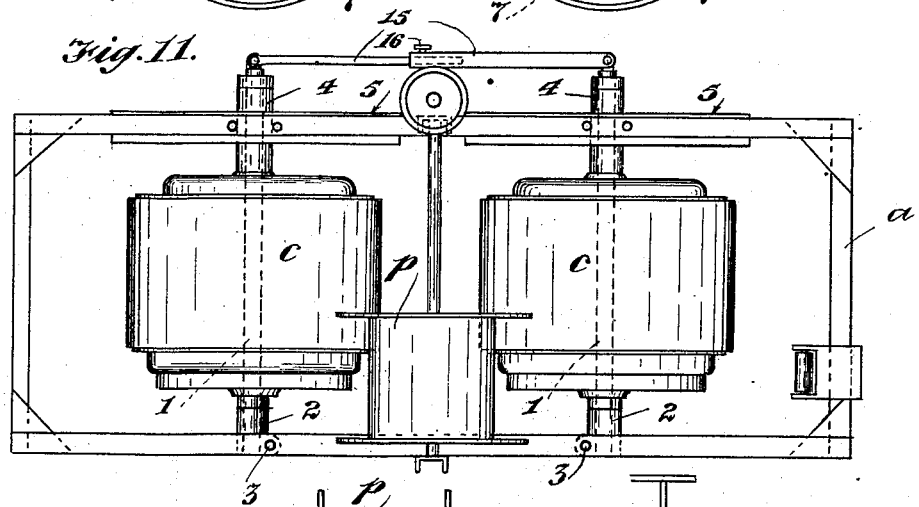
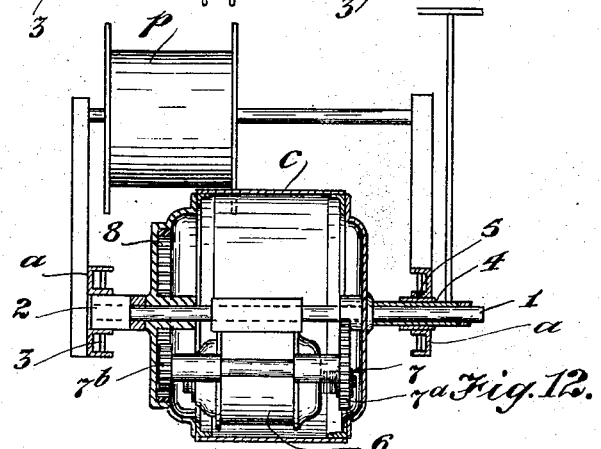

Patented Apr. 12, 1932

1,854,052

UNITED STATES PATENT OFFICE

ANDREW McDOWALL, OF DREM, EAST LOTHIAN, SCOTLAND

TRACTOR

Application filed November 20, 1928, Serial No. 320,555, and in Great Britain November 29, 1927.

This invention has reference to tractors and relates particularly to tractors for agricultural purposes, which will travel backwards and forwards in a substantially straight line and which at the end of each travel can be moved so that its next line of travel is parallel to and adjacent to the previous line of travel.

Thus when used in ploughing a field for example, the tractor is fitted with a plough at each end and is moved at the end of its travel so that it is in a position to plough a furrow or furrows adjacent to and parallel with the furrow previously made, always using the rear plough.

The improved tractor, according to my invention, comprises a chassis or framework provided with front and rear axles each having a wheel or wheels mounted thereon and each capable of a partial circumferential movement in a horizontal plane about a point at or near one end thereof, or at the side of the wheel or wheels, the arrangement and construction being such, that, on the tractor reaching the end of its travel, the axles, by reason of their driving thrust, are permitted to partake of a partial circumferential movement thus slewing the wheels so that the tractor can be moved to a position to the side of its previous line of travel, and on the drive being reversed the axles are returned to their normal position, in which position they are locked, so that the tractor can then travel in a line parallel to its previous line of travel.

My invention further consists in providing means whereby the angle which the axle, or axles, makes, or make, to the line of travel of the tractor can be adjusted during the backward and forward travel of the tractor to effect steering.

My invention still further consists in one end of each axle being arranged to slide in horizontal guides, means being provided to retain the axles in their normal central position in said guides. Means are also provided whereby one or both of said guides with axle or axles locked therein can be adjusted horizontally and relative to the tractor chassis or frame. By such construction steering can be effected by operating the guide or guides while, to bring the tractor to the required position at the end of its travel the said axles are permitted or actuated to assume an angle to the travel of the tractor.

Where both guides are adjustable to effect steering they may be so interconnected that the thrust of the one and the pull of the other balance each other, in so far as steering is concerned, so that the driver has not to steer or hold against a one sided pull.

If desired a castor wheel or wheels may be located at the side or sides of the tractor to ensure stability.

Said tractor is conveniently operated by an electric motor mounted thereon or within the tractor wheels, and supplied by current from a cable wound on a drum also carried by the tractor, said cable being in turn supplied with current from a convenient source, for example the farm supply line at the end of the field or by a feeder cable. The latter may be connected directly to a suitable main or source of current supply or it may be wound on a drum carried by an auxiliary apparatus arranged to co-operate with the tractor as set forth in my prior Patent No. 1,694,226, dated December 4, 1928.

In order that my invention will be properly understood I have hereunto appended four sheets of drawings whereon:—

Figure 1 is an elevation of one construction of tractor in accordance with my invention.

Figure 2 is a plan view thereof, and

Figure 3 is an end elevation thereof.

Figure 4 is a diagrammatic elevation of the tractor as seen from the other side showing a preferred arrangement for effecting steering.

Figure 5 is a sectional end elevation to an enlarged scale on the line 5—5, Figure 4.

Figure 6 is a sectional plan view, also on an enlarged scale, on the line 6—6, Figure 4.

Figure 10 is an elevation of the improved tractor provided with motors located within the wheels.

Figure 11 is a plan view thereof and Figure 12 is an irregular sectional end elevation thereof.

Figure 7:
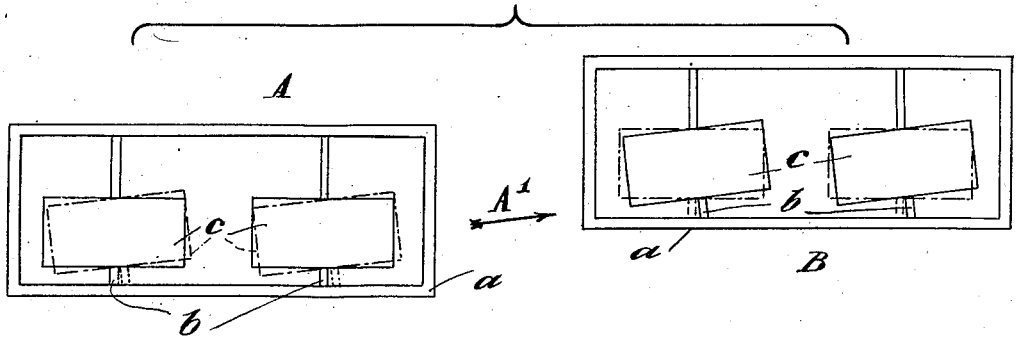
Figure 7 illustrates diagrammatically a plan view of the tractor in two positions showing how the tractor is brought into a position at the side of and parallel to its last line of travel.

The tractor illustrated in Figures 1 to 7 comprises a rectangular frame or chassis $a$ having a front and rear axle $b$ $b$ on each of which is mounted a broad wheel $c$ $c$. One end of each of said axles is coupled by means of a universal coupling $d$ to a driving member $e$, which members in turn are driven through reducing gear from an electric motor $e^1$ carried by the chassis.

In the arrangement illustrated, see particularly Figure 3, the motor $e^1$ drives a pinion wheel $f$ in mesh with a spur wheel $f^1$ carried by a lay shaft $f^2$. Loose on the latter are two pinion wheels $f^3$ and $f^4$ in mesh with spur wheels $f^5$ and $f^6$ respectively, both mounted on a driving shaft $f^7$. A dog clutch $f^8$ is provided to clutch either of said pinions $f^3$ and $f^4$ to shaft $f^2$, the intermeshing wheels being designed to give two speed ratios.

On said shaft $f^7$ are two sprocket wheels $f^9$ and $f^{10}$ which, through chain drives and sprocket wheels $f^{11}$ and $f^{12}$, drive the driven members $e$.

It will be understood that any other suitable form of transmission gear may be employed.

The other ends of the axles $b$ are journalled in bearings $g$, see Figures 5 and 6, which are arranged to slide in guides $h$ which, in turn, are capable of a horizontal sliding movement with respect to the chassis $a$.

Pins $o$ located at each side of the bearings $g$ normally prevent any movement of said bearings relative to the guides $h$. Said guides may be curved, the curvature being that of a circle struck with the corresponding universal coupling as centre. Or, instead of being curved, the guides may be straight as illustrated and, in such case, the bearings must be capable of sufficient play to permit them to accommodate themselves to the movement of the axles.

Said guides are connected to the steering wheel or the like $i$ through any suitable mechanism.

In the arrangement shown in Figure 4 a rod $i^1$ oppositely screw threaded at the two ends thereof, screws within correspondingly internally threaded holes provided therefor in the opposed ends of the two guides $h$. Said rod takes the thrust and pull from one end of the ground wheel axles $b$ and transmits the resultant force to the chassis through the thrust bearing $x$, Figure 4 and carries a bevel wheel $i^4$ with which meshes a bevel wheel $i^2$ carried by the rod $i^3$ of the steering wheel $i$.

The arrangement is such that by the operation of the steering wheel said screw threaded spindle is caused to draw the two guides towards or away from each other and, in doing so, the two axles are caused to articulate about their universal couplings $d$ so that the wheels are slightly slewed.

It will be noted that the thrust and pull transmitted to the rod $i^1$ by the rear and leading guides respectively balance each other so that no great stress is placed on the steering mechanism and thereby rendering the steering easier.

Said gear enables the tractor to be steered and held to its course.

$z^2$, Figures 1 and 2 are horizontal and vertical rollers supported by uprights $z^1$ which guide the current supply cable clear of the chassis or framework of the vehicle.

The operation of the tractor at the end of its travel and prior to commencing the next travel is as follows.

When approaching the end of each travel the rear or idle pins $o$ or the like which are adjacent to the rear ends of the bearing $g$, see Figs. 4, 5 and 6, are withdrawn and when the end of the travel is reached the tractor motor $e^1$ is reversed by the operation of a switch not shown. The motor drives the axles through the universal couplings with the result that, as the bearings $g$ of the axles are free to move in the guide $h$ they immediately assume an angle to the line of travel of the tractor, such movement being restricted by fixed stops $h^1$ or other suitable means as indicated in Figure 6.

In Figure 7, A shows in dotted lines the position assumed by the wheels and axles after the motor has been reversed as aforesaid.

The tractor is then inclined or moved for a short distance, say a few yards, at an angle to its previous line of travel, as indicated by the arrow $A^1$, the tractor being then in the position B. The driving motor is again reversed by the operation of a switch and under the action of the thrust of the drive imparted to the wheels this results in the axles being swung round until they assume their normal position, the withdrawn pins $o$ or the like are dropped into position, and on the driving motor being again reversed the tractor is ready for the next travel.

The foregoing operations are repeated at the end of each travel.

It will be noted that when the tractor is being manœuvred to occupy the side position both axles swing round in a horizontal plane in either a clockwise or anti-clockwise direction.

When said axles are operated by the steering gear they swing round in opposite directions so that the tractor is more responsive to the operation of said steering gear. If desired, however, only one of the axles may be so operated to effect steering.

In Figure 6, the axle, bearing and guide are shown in their normal position, the chain dotted lines indicate the axle and bearing when moved relative to the guide to effect slewing of the tractor wheels and the regularly dotted lines indicate the position of the axle, bearing and guide when moved to steer the tractor during its travel.

Figure 8:
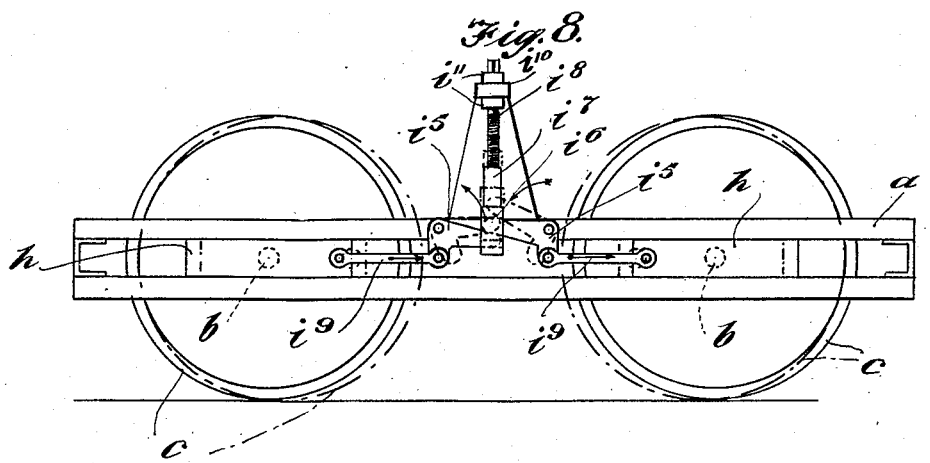
Figure 8 illustrates diagrammatically alternative mechanism by which steering is effected.

Figure 8 illustrates a modified construction of mechanism for effecting steering and wherein each guide $h$ is connected by a link $i^9$ to one arm of a pair of bell cranks $i^5$ fulcrumed to the chassis. The ends of the other arms of the bell cranks are housed in a box or frame $i^6$ shown in Fig. 8 as being carried on the lower end of an internally threaded tubular rod $i^7$ into which is screwed a screw threaded spindle $i^8$ to which is attached the steering wheel $i$.

The spindle $i^8$ is supported by the chassis in such manner that it is incapable of vertical movement relative thereto. For example, the spindle $i^8$ may be mounted in a bearing $i^{10}$ secured to the chassis, collars $i^{11}$ on the screw $i^8$ preventing vertical movement thereof.

The arrangement is such that by the operation of the steering wheel said bell cranks are operated to move the two guides towards or away from one another. In doing so the two axles are caused to articulate about their universal couplings $d$ so that the wheels are slightly slewed.

Likewise with such gear it will be noted that the thrust and pull transmitted to the bell cranks by the rear and leading guides respectively counteract each other in the steering column box $i^6$.

The arrows in Figure 8 indicate the two bell cranks opposing each other when the tractor is moving to the right, and when moving to the left the bell cranks act in opposite directions on the box or frame $i^6$.

The motor $e^1$ is supplied with current by means of a cable wound on a drum $p$.

Figure 9:
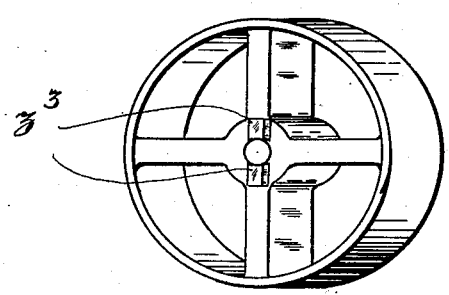
Figure 9 illustrates a construction of tractor wheel designed to facilitate the slewing thereof.

To balance the tractor a castor $k$ (see Figs. 1 and 2) may be provided at the side thereof. Each axle may have mounted thereon a single broad wheel or alternatively a series of wheels such as shown in Figure 9, said wheels each having co-operating projections $z^3$ whereby they are normally driven in unison from one of the wheels, the wheel furthest from the universal joint being keyed on the shaft when the tractor is reversed to effect slewing, the wheels which partake of the smallest travel are allowed to rotate to a limited extent by the co-operating projections $z^3$.

As indicated in Figures 1 and 2 the plough or the like may be secured to the tractor by means of suitable connections such as jointed links $z$, secured to swivel on the chassis near the transverse centre line thereof so that the tractor will have more freedom to respond to the steering gear and the plough will not be diverted from its natural lines, and further, the tendency of the load will then be to hold the leading wheel to the ground.

In the tractor shown in Figures 10, 11 and 12 the wheels $c$, $c$ are mounted to rotate on axles 1, 1, which, at one end thereof, fit into sleeves or blocks 2, 2, pivoted to the framework or chassis $a$ at 3, 3. The other ends of said axles fit into hollow rollers 4, 4 which are normally retained fixed in position within the guide boxes 5, 5. The latter are capable of a sliding movement with respect to the framework or chassis $a$. The means whereby the said guides with the ends of the axles housed therein can be operated to effect steering and released to slew the tractor may be exactly similar to that already described. It will be noted, however, that in place of the moving ends of the axles being carried in sliding bearings they are mounted in hollow rollers which roll when the axles are manipulated to effect slewing of the tractor.

Said axles do not rotate and have mounted thereon and within the wheels $c\ c$ the electric motors 6, 6, each of which, through a train of spur wheel gearing, 7, 7$^a$ and 7$^b$ drives an internally toothed ring 8 secured to the respective wheels. Said motors are supplied with current from a cable on the drum $p$.

The operation of the modified construction of tractor is substantially similar to that previously described. That is, during its backward and forward movements steering is effected by moving the guide boxes with axles contained therein relative to the framework or chassis, and to effect slewing at the end of its travel the ends of the axles, carried by the guides are permitted to move relative to the guides under the action of the thrust of the motors. By such construction there is an absence of external gearing and by locating the motors below the axles, as indicated, the centre of gravity of the tractor is kept low.

The two axles may be interconnected when the tractor is being slewed to ensure that its two wheels will operate in unison. This may be effected, for example, by the rods or links 15 connected to the ends of the axles remote from pivots 3 and which are telescopic one within the other and are connected together by means of a pinch screw or the like 16 when the tractor is being slewed but when the tractor is operating normally, that is, when it is traversing backwards and forwards said pinch screw is released.

In place of driving the tractor by means of an electric motor any other suitable prime mover may be used.

What I claim is:—

1. A tractor comprising a framework, front and rear axles, wheels on said axles, each axle being capable of a partial circumferential movement in a horizontal plane about a pivot point in proximity to one end thereof, a motor to drive said wheels, means to normally retain said axles so that the tractor will travel in a substantially straight line in the direction of its length and which can be operated to permit the axles to turn about their pivots, and means to guide the other ends of each axle when freed from said retaining means so that solely under the driving thrust of the wheels each axle effects a partial rotation in a horizontal plane about its pivot to permit the tractor to be slewed.

2. A tractor comprising a chassis, a front axle pivoted in proximity to one end thereof so as to be capable of a partial rotary movement in a horizontal plane, a rear axle likewise pivoted in proximity to one end thereof and capable of a partial circumferential movement in a horizontal plane, wheels on said axles, means to drive said wheels, guides for the ends of said axles remote from the pivot points, means to normally retain both axles so that the tractor will travel backward and forward in a substantially straight line in the direction of its length, and which retaining means can be operated to free the ends of the axles to permit the latter to assume such position solely under the action of the driving thrust that the wheels are automatically slewed and the tractor moved at an angle to its original line of travel.

3. A tractor comprising a chassis, a front axle and a rear axle, wheels on said axles, each axle being pivoted at one end thereof, guides to constrain the movement of the other ends of said axles, a motor carried by said chassis and geared to drive said axles, means to hold normally the axles in a definite position with respect to said guides, and, which can be operated, permit the axles to effect a partial rotation in a horizontal plane about their pivots solely under the action of their driving thrust, the axles then assuming such position that the tractor is automatically slewed.

4. A tractor comprising a frame work, front and rear axles, wheels mounted on said axles, a driving motor carried by said framework, each axle being capable of a partial circumferential movement in a horizontal plane about a point in proximity to the one end thereof, a sliding bearing for the end of each axle remote from the pivot point, a horizontal guide for said bearing and means to retain the axles in a definite position with respect to said guides until it is required to slew the tractor whereon said retaining means can be operated to permit the said bearings to move in their guides, the axles then assuming an angle to their former position solely under the driving thrust of the motor.

5. A tractor comprising a framework, front and rear axles, a driving motor carried by said framework, each axle being capable of a partial circumferential movement in a horizontal plane about a point in proximity to one end thereof, a sliding bearing for the end of each axle remote from the pivot point, a horizontal guide for said bearing, means to adjust at least one of said guides with bearing therein with respect to the framework, to effect steering, and means to retain the axles in a definite position with respect to said guides until it is required to slew the tractor, whereon said retaining means can be operated to permit of said bearings to move in their guides, solely under the action of the driving thrust of the wheels, the axles then assuming an angle to their former position so that the tractor then travels at an angle to its former line of travel.

6. A tractor comprising a framework, front and rear axles, wheels mounted on said axles, a driving motor carried by said framework, each axle being capable of a partial circumferential movement in a horizontal plane about a point in proximity to the other end thereof, a sliding bearing for the end of each axle remote from the pivot point, a horizontal guide for each of said bearings, steering gear operatively connected to said guides, the thrust of one axle on the steering means being balanced by the pull transmitted thereto by the other, and means to retain the axles in a definite position with respect to said guides so that the tractor will travel in the direction of its length until it is required to slew the tractor, whereon said retaining means can be operated to permit the said bearings to move in their guides, the axles then assuming an angle to their former position solely under the thrust of the wheels.

7. A tractor comprising a framework, front and rear axles, wheels mounted on said axles, a driving motor carried by said framework, each axle being capable of a circumferential movement in a horizontal plane about a point in proximity to the other end thereof, a sliding bearing for the other end of each axle remote from the pivot point, a horizontal guide for each of said bearings a spindle having a left hand thread at one end thereof and a right hand screw thread at the other end thereof, said screwed ends engaging the opposed ends of said guides, steering gear to rotate said spindle, and means to retain the axles in a definite position with respect to said guides so that the tractor will travel in the direction of its length until it is required to slew the tractor whereon said retaining means can be operated to permit the said bearings to move in their guides, the axles then assuming an angle to their former position solely by reason of the thrust of the wheels, whereon the tractor can be moved at an angle to its former line of travel.

8. A tractor comprising a framework, front and rear axles, wheels mounted on said axles, an electric motor located within and arranged to drive at least one of said wheels and secured to the corresponding axle, each of said axles being pivoted in proximity to one end thereof while the other end thereof is capable of a partial circumferential movement about the pivot, means to normally hold said axles in a definite position with respect to the chassis so that the tractor can travel in a substantially straight line in the direction of its length, said retaining means when disengaged from the axles permitting the latter to move in a horizontal plane about their pivot points solely under the thrust imparted to the wheels so that the tractor is then in a position to be slewed.

9. A tractor comprising a framework, front and rear axles, wheels on said axles, each axle being capable of a partial circumferential movement in a horizontal plane about a piviot point in proximity to one end thereof, means to normally retain said axles so that the tractor can travel in a substantially straight line, means to guide the other ends of each axle when freed from said retaining means so that solely under the driving thrust of the axles each axle effects a partial rotation in a horizontal plane about its pivot to permit the tractor to be slewed and means interconnecting the ends of said axles remote from their pivot points so that they move in unison.

10. A tractor comprising a framework, front and rear axles, wheels on said axles, each axle being capable of a partial circumferential movement in a horizontal plane about a point in proximity to one end thereof, horizontal guides for the ends of said axles remote from their pivot points, means to normally retain said axles in a fixed position with respect to said guides so that the tractor can travel in a substantially straight line, means to adjust said guides relative to the framework to effect steering during the travel of the tractor, the ends of the axles when freed from said retaining means moving in said guides solely under their driving thrust to assume an angle to their previous position to enable the tractor to be slewed.

11. A tractor comprising a framework, front and rear axles, wheels on said axles, each axle being pivoted at one end thereof, a motor to drive said wheels, horizontal guides for the other ends of said axles, means to normally fix the ends of the axles in said guides, steering gear to simultaneously move said guides with the ends of the axles fixed therein towards or away from each other, the axles, on being freed from said retaining means, moving to occupy a position at an angle to their previous position solely under the action of their driving thrust to permit the tractor to be slewed.

12. A tractor comprising a framework, front and rear axles, wheels on said axles, each axle being pivoted at one end thereof, a motor to drive said wheels, horizontal guides for the other ends of said axles, means to normally retain the ends of the axles centrally of the guides, stops at the two ends of said guides to restrict the movement to the ends of the axles in said guides when freed from said retaining means and steering gear to adjust the guides with the ends of the axles secured thereto relative to the framework to effect steering during the travel of the tractor.

13. A tractor comprising a framework, a front axle and a rear axle both incapable of rotation about their own axis, and each axle being pivoted in proximity to one end thereof, horizontal guides for the other ends of said axles, wheels mounted on said axles, electric driving motors mounted on said axles and within the wheels, reducing gear connecting the motors with the wheels, retaining means to normally fix the ends of the axles within the guides and which can be operated to permit the axles to be slewed under their driving thrust, and means to move the guides with axles secured therein relative to the chassis to effect steering.

ANDREW McDOWALL.